July 9, 1957 C. A. BODLE ET AL 2,798,297
DEVICE FOR MEASURING THE LENGTH OF ELONGATED ARTICLES
Filed Dec. 18, 1953 4 Sheets-Sheet 1
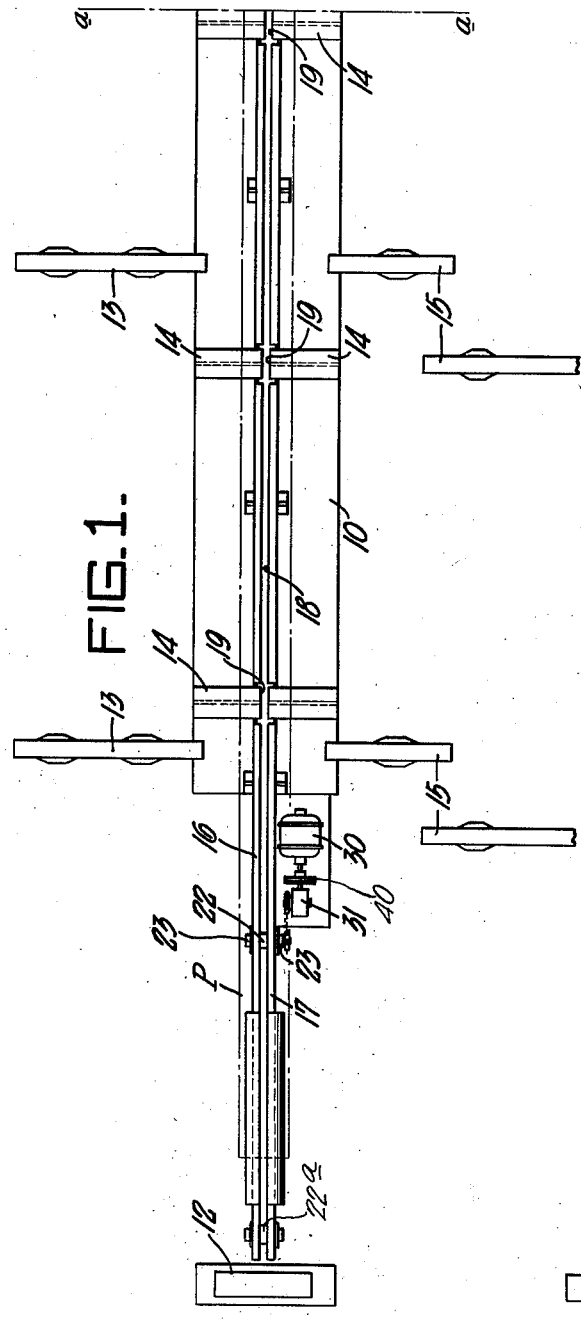
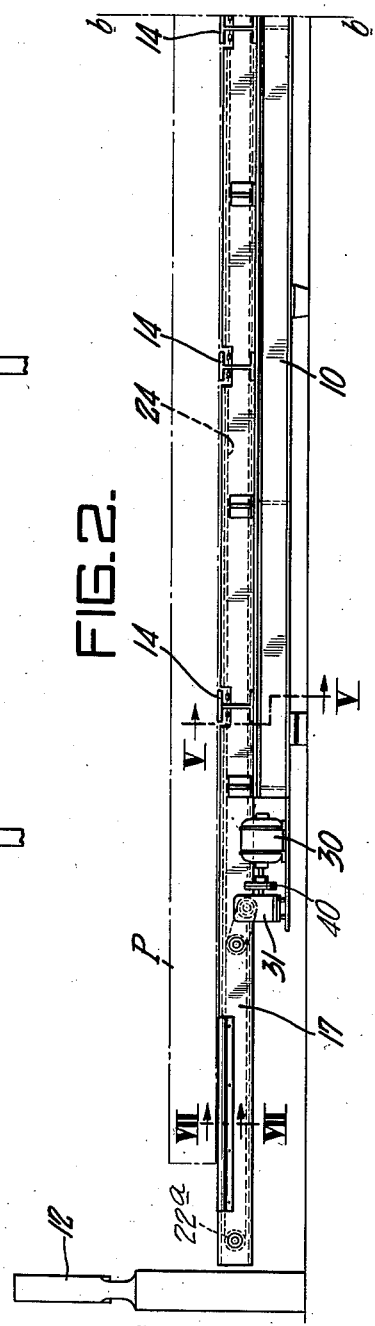
Inventors:
CHESTER A. BODLE and
GEORGE SNEDDON, JR.,
by: Donald G. Dalton
their Attorney.

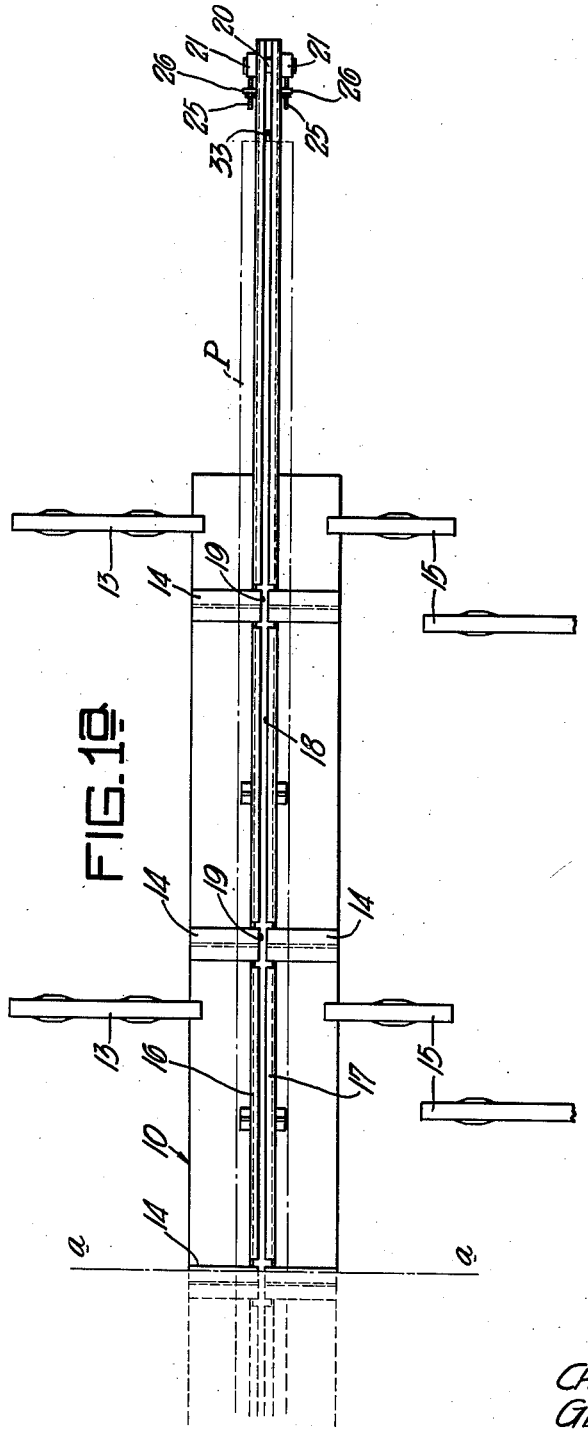
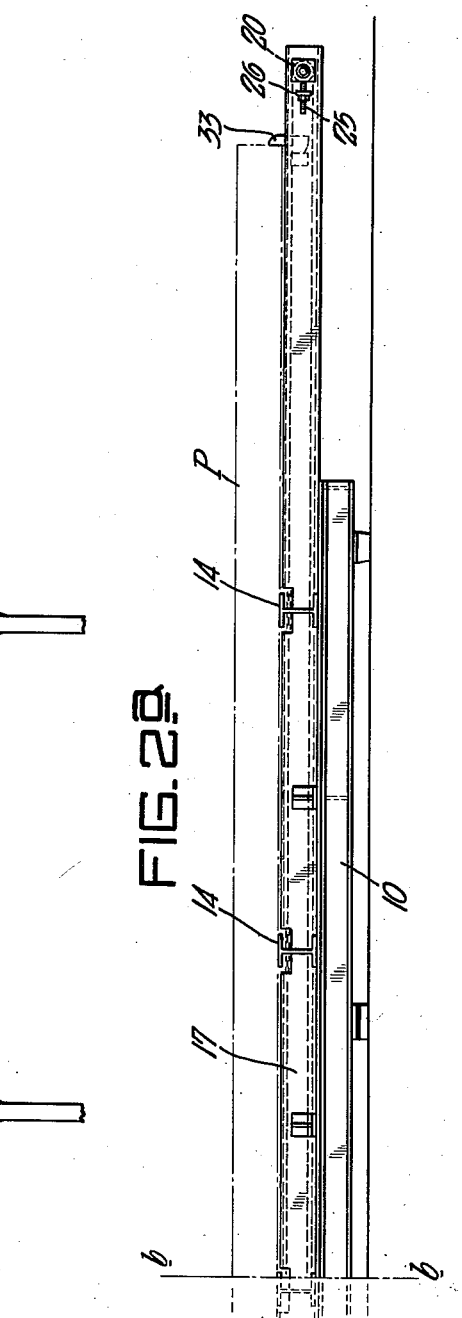

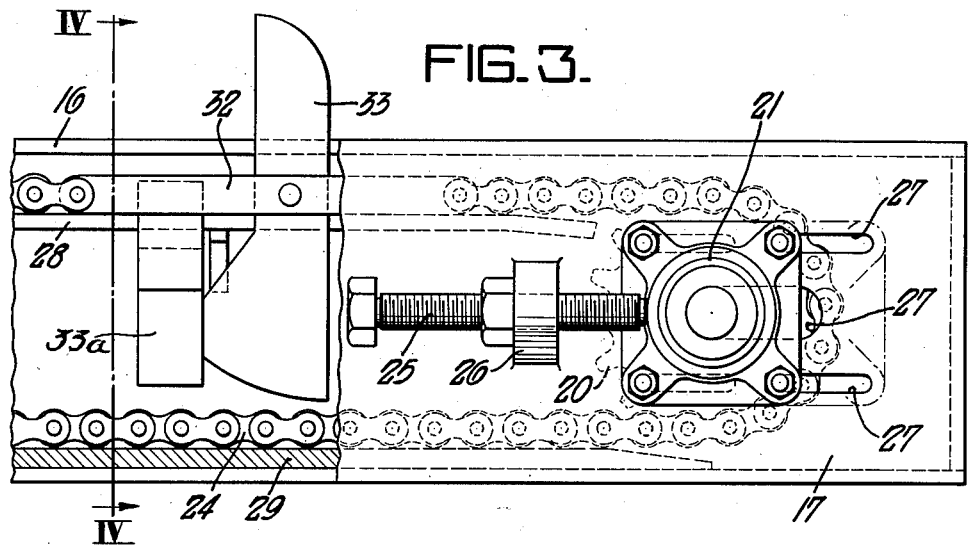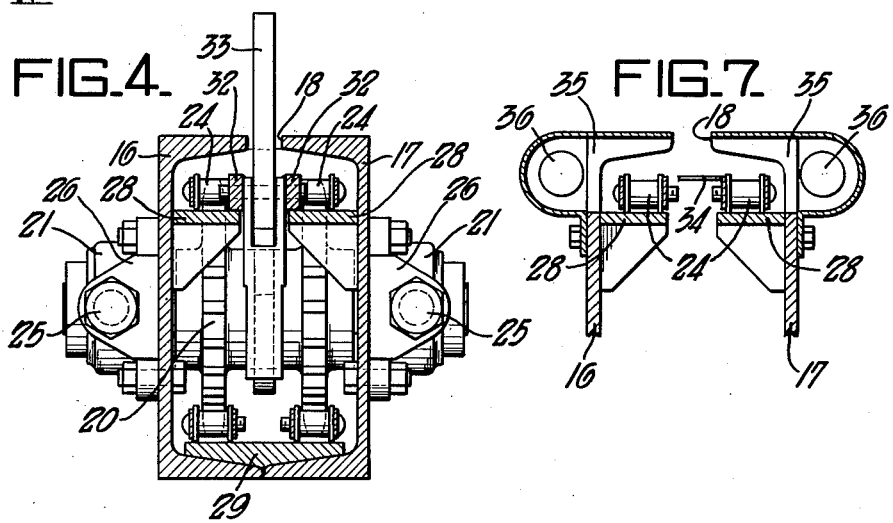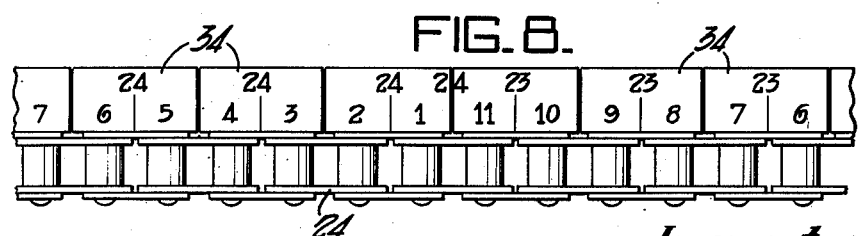

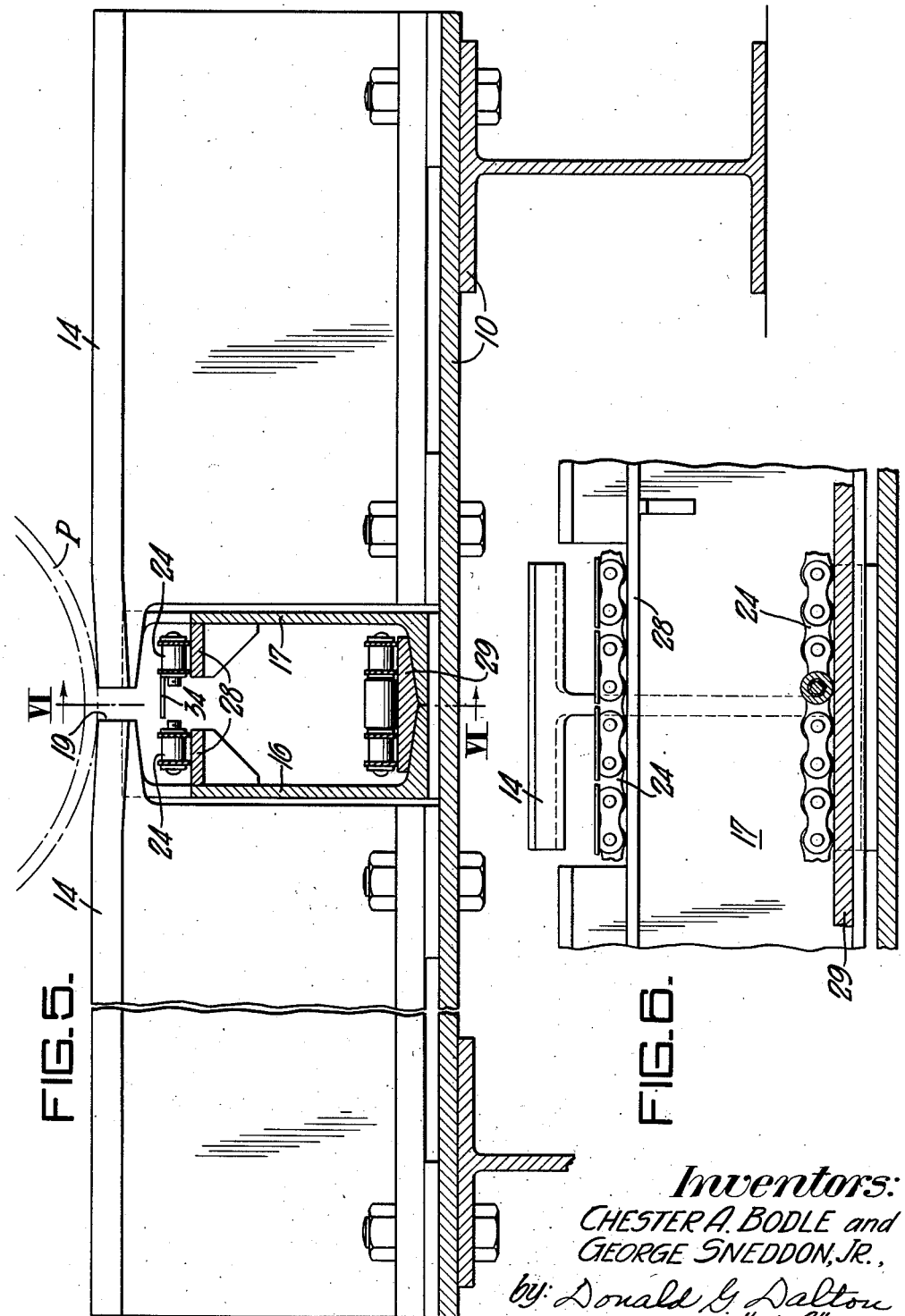

2,798,297
Patented July 9, 1957

2,798,297

DEVICE FOR MEASURING THE LENGTH OF ELONGATED ARTICLES

Chester A. Bodle, Fort Lauderdale, Fla., and George Sneddon, Jr., McKeesport, Pa., assignors to United States Steel Corporation, a corporation of New Jersey Application December 18, 1953, Serial No. 398,956

1 Claim. (Cl. 33—125)

This invention relates to an improved device for measuring the length of elongated articles, such as pipes.

An object of the invention is to provide an improved measuring device which can be associated with other equipment, such as a weighing scale, and can measure the length of an article by a simple mechanical operation.

A further object is to provide an improved measuring device which enables an operator to observe the length of an elongated article at the same time he weighs the article without any awkward manipulation of a measuring stick.

A more specific object is to provide an improved measuring device which includes a set of motor driven graduated chains, and stop means carried thereby to abut the end of an article, the graduations being observable from an operator's position at a weighing scale or the like.

In accomplishing these and other objects of the invention, we have provided improved details of structure, a preferred form of which is shown in the accompanying drawings, in which:

Figure 1 is a top plan view of a portion of a weighing scale equipped with a measuring device constructed in accordance with our invention;

Figure 1a is a top plan view which is a continuation of Figure 1;

Figure 2 is a side elevational view of the portion of the scale and measuring device shown in Figure 1;

Figure 2a is a side elevational view which is a continuation of Figure 2;

Figure 3 is a side elevational view on a larger scale and partly broken away of the mechanism at the outer end of our measuring device;

Figure 4 is a vertical section on line IV—IV of Figure 3;

Figure 5 is a vertical section on a larger scale on line V—V of Figure 2;

Figure 6 is a vertical section on line VI—VI of Figure 5;

Figure 7 is a vertical section on a larger scale on line VII—VII of Figure 2; and Figure 8 is a top plan view of a portion of the chain and tabs embodied in our device.

As one example of equipment with which our measuring device can be associated, Figures 1 and 2 show a weighing scale which includes a platform 10 and a dial 12. The scale is adapted to weigh elongated articles P, such as pipes during their manufacture. It is customary to weigh each pipe after it has been tested hydrostatically and otherwise finished, and also for the scale operator to measure the length of each and to stencil both the weight and length thereon. Pipes are introduced singly from an approach table 13 to the scale platform, where they are supported on transverse skids 14. After being weighed, measured and stenciled, they are kicked out to a discharge table 15. The foregoing parts can be of any standard or desired construction, and hence are not shown nor described in detail.

In accordance with our invention, the platform 10 carries a pair of opposed elongated channels 16 and 17 which are situated beneath the skids 14 and extend substantially the length of the platform (Figure 4). The bottom flanges of said channels abut, but the top flanges are shortened to leave a narrow longitudinal gap 18 therebetween. The skids 14 are formed in sections, leaving gaps 19 therebetween which register with the gap 18 (Figure 5). Our measuring device comprises an idler double sprocket 20 mounted in bearings 21 at the outer end of the channels 16 and 17 (that is, the end away from the dial 12), is driven double sprocket 22 mounted in bearings 23 intermediate the length of said channels, a second double idler sprocket 22a at the inner ends of the channels, and a pair of endless chains 24 which run over the three sprockets. Preferably the bearings 21 are adjustable lengthwise of the channels 16 and 17 to furnish a take-up for the chains 24 (Figure 3). The adjustable mounting illustrated includes screws 25 threadedly engaged with bosses 26 on the outside faces of the channels 16 and 17 and abutting the outside of the bearings. The channels contain slots 27 in which the bearings can slide. The inner faces of the channels carry brackets 28 and a base plate 29 on which the upper and lower runs of the chains 24 rest to prevent sagging (Figure 5). The sprocket 22 is driven from a reversible motor 30 and a gear reducer 31 (Figures 1 and 2).

The chains 24 carry stop means adapted to abut the outer end of each article P as it rests on the skids 14 over the gaps 18 and 19 (Figure 2a and 3). The stop means illustrated includes a pair of bars 32, each of which is interposed between the links of the upper run of a different one of the chains, and a weighted dog 33 pivoted on a transverse axis between said bars and extending through the gaps 18 and 19. When the motor 30 propels the upper runs of the chains toward the dial 12, the dog 33 is adapted to abut the end of an article P to prevent further movement of the chains. As shown in Figure 3, the bars 32 carry a depending abutment 33a which the lower end of the dog 33 engages to prevent its pivotal movement when abutting the end of an article. The drive to the sprocket 22 includes a suitable slip clutch 40 to enable the chains to stop when the dog thus engages an article. When the chains move in the opposite direction, the dog can pivot downwardly and does not interfere with movement of the chains.

A series of graduated tabs 34 are mounted along a segment of the chains 24 (Figure 8). These tabs are attached between the two chains so that they are visible to an operator through the gap 18. Preferably the upper flanges of the channels 16 and 17 are cut away adjacent the operator's station, as indicated at 35 (Figure 7), to facilitate reading said tabs. If desired, the channels can be equipped with lights 36 adjacent these cut away portions.

In operation, elongated articles P are fed singly from the approach table 13 to the skids 14 and each comes to rest over the gaps 18 and 19. The motor 30 is operated in the appropriate direction to move the dog 33 into engagement with the outer end of the article. If the article is longer than the preceding article, the dog 33 can pivot downwardly as it moves back under the article. The operator then reads the length of the article, as indicated by the tabs 34. The article comes to rest on the skids in a position such that its inner end is opposite the cut away portions 35 and light 36 to facilitate this reading. In the example of a pipe weighing operation, the weight of the pipe also is observed, and both the length and weight are stenciled thereon.

From the foregoing description, it is seen that our invention enables an operator readily to measure the length of elongated articles without any awkward manipulation of a measuring stick or the like. Instead the length can be determined simultaneously with another operation, such as weighing the articles. Consequently the invention expedites both operations and increases the production rate.

While we have shown and described only a single embodiment of the invention, it is apparent that modifications may arise. Therefore, we do not wish to be limited to the disclosure set forth but only by the scope of the appended claim.

We claim:

A device for measuring the length of elongated articles comprising a pair of opposed elongated channels spaced apart at their upper edges to leave a longitudinal gap, longitudinally spaced double sprockets journalled between said channels, chains carried by said sprockets, drive means connected with one of said sprockets for moving said chains and including a slip clutch, means on said channels for preventing sagging of said chains, an upwardly projecting retractable dog pivoted to said chains and extending through said gap for abutting one end of an article positioned thereabove, a counterweight carried by said dog below its pivotal connection to the chains to hold it normally in its projected position, an abutment carried by said chains for engagement by said counterweight to prevent pivotal movement of the dog while abutting an article, and graduated tabs carried by said chains and adapted to be positioned adjacent the opposite end of the article, said slip clutch permitting the chains to stop when said dog abuts an article before the drive means stops, and pivotal movement of said dog permitting the chains to move back when an article overlies the dog.

References Cited in the file of this patent

UNITED STATES PATENTS

| | | |
|---|---|---|
| 493,726 | Ivey | Mar. 21, 1893 |
| 669,111 | Acklin | Mar. 5, 1901 |
| 782,642 | Bradford | Feb. 14, 1905 |
| 1,706,501 | Smith | Mar. 26, 1929 |
| 1,813,130 | Ahnger | July 7, 1931 |
| 1,933,446 | Olson | Oct. 31, 1933 |
| 2,132,455 | Bishop | Oct. 11, 1938 |
| 2,198,036 | Isted | Apr. 23, 1940 |
| 2,229,973 | Hormel | Jan. 28, 1941 |